United States Patent [19]

Connolly

[11] 4,260,484

[45] Apr. 7, 1981

[54] PROCESS FOR RENEWING THE ADSORPTIVE CAPACITY OF A BED OF ACTIVE CARBON

[75] Inventor: John F. Connolly, Glen Ellyn, Ill.

[73] Assignee: Standard Oil Company (Indiana), Chicago, Ill.

[21] Appl. No.: 24,946

[22] Filed: Mar. 29, 1979

Related U.S. Application Data

[63] Continuation-in-part of Ser. No. 844,024, Oct. 20, 1977, abandoned, which is a continuation-in-part of Ser. No. 699,080, Jun. 23, 1976, abandoned.

[51] Int. Cl.³ ............................................ B01J 20/34
[52] U.S. Cl. ............................... 252/411 R; 204/149; 210/748; 210/674
[58] Field of Search ............. 210/39, 40, 30 R, 30 A; 204/149, 152; 568/758; 252/411 R, 420

[56] References Cited

U.S. PATENT DOCUMENTS

| | | | |
|---|---|---|---|
| 3,730,864 | 5/1973 | Tarjanyi | 204/149 |
| 3,730,885 | 5/1973 | Makrides et al. | 210/40 |
| 4,131,526 | 12/1978 | Moeglich | 204/149 |

*Primary Examiner*—Benoît Castel

*Attorney, Agent, or Firm*—Gregory E. Croft; William T. McClain; William H. Magidson

[57] ABSTRACT

Disclosed is a process for renewing the adsorptive capacity of a bed of active carbon by electrochemical adsorbate transformation. This process comprises the steps of contacting a bed of carbon with an effluent containing at least one hydroxyaromatic compound containing at least one OH group joined directly to the aromatic ring until an appreciable amount of the compound is adsorbed onto the bed of carbon. A conductive solution is then introduced to the bed of carbon and the carbon is made the positive potential of an electrolytic cell. A positive potential is applied to the bed of carbon which is sufficient enough to transform the compound into a species which has either a high affinity for the carbon or a low affinity for the conducting solution, with the potential being less than that required for complete oxidation of the compound. The applied potential is then withdrawn and effluent containing at least one hydroxyaromatic compound is reintroduced to the bed of carbon. This procedure is repeated until the bed of carbon is no longer able to remove additional compounds from the effluent.

5 Claims, No Drawings

PROCESS FOR RENEWING THE ADSORPTIVE CAPACITY OF A BED OF ACTIVE CARBON

CROSS-REFERENCE TO RELATED APPLICATIONS

This application is a continuation-in-part of previous application Ser. No. 844,024 filed Oct. 20, 1977 which is a continuation-in-part of parent application Ser. No. 699,080 filed June 23, 1976 both now abandoned.

BACKGROUND OF THE INVENTION

1. Field of the Invention

This invention relates to a process for renewing the adsorptive capacity of a bed of carbon by electrochemical adsorbate transformation. By this process, a bed of active carbon is contacted with an effluent containing at least one hydroxyaromatic compound containing at least one OH group joined directly to the aromatic ring until an appreciable amount of the compound is adsorbed onto the bed of carbon. A conductive solution is then introduced to the bed of carbon and the carbon is made the positive potential of an electrolytic cell. A positive potential is applied to the bed of carbon which is sufficient enough to transform the compound into a species which has either a high affinity for the carbon or a low affinity for the conducting solution, with the potential being less than that required for complete oxidation of the compound. The applied potential is then withdrawn and effluent containing at least one hydroxyaromatic compound is reintroduced to the bed of carbon. This procedure is repeated until the bed of carbon is no longer able to remove additional compounds from the effluent.

2. Description of the Prior Art

The treatment of effluents, such as waste water, is a major consideration of all factories, power plants and municipalities. Today, there is hardly an industry in existence which doesn't have to allocate a substantial amount of money to regenerate or recondition effluents used for washing, cooling or cleaning purposes in some phase of a production process. Aside from the major costs associated with designing and constructing treatment facilities, and purchasing expensive carbon regeneration equipment, there is the cost of purchasing initial carbon fill and replenishing the five to fifteen percent which is used every time a conventional regeneration is accomplished. Any method which could increase the adsorption ability of the carbon thereby extending the time period between conventional regenerations would yield a reduction of the amount of carbon which would have to be used. This will decrease the daily replacement cost of the carbon and could also possibly reduce the cost of the regeneration equipment.

Most pollutants in aqueous effluents contain hydroxyaromatic compounds, which compounds are defined for purposes of this invention as compounds containing at least one OH group joined directly to the aromatic ring. Examples of such hydroxyaromatic compounds are phenol, substituted phenol, naphthol, etc. These compounds are highly soluble in water and therefore do not tend to load up a carbon bed as heavily as other components contained in the effluent. Therefore, any method which would increase the total uptake of such compounds per weight of carbon employed would increase the efficiency of the carbon treating process. Presently there are two noticeable ways to renew the adsorptive capacity of a bed of carbon, by oxidation and by adsorption-desorption. Oxidation involves a process in which the carbon is physically transferred by mechanical means from the bed to a furnace where it is burned. In the furnace about ten to twenty percent of the carbon is burned up in trying to sufficiently oxidize the carbon. The remaining carbon is then returned to the bed where adsorption again takes place. The second method encompasses adsorbing the diluents from an effluent onto the surface of the carbon. The remaining effluent is then withdrawn and replaced by a second smaller solution. A potential is then applied to the bed of carbon to get the diluents to desorb into the second more concentrated solution. When the second solution acquires a sufficient concentration so that it will no longer function as a source which will extract additional diluents from the carbon, it is withdrawn and disposed of. The carbon is regenerated by this desorbing step, at least to a certain extent, and can now absorb additional diluents contained in another effluent stream. The major deficiencies of this system are that the second somewhat concentrated solution has a very large volume and has to be disposed of, such as by dumping which is an environmental hazard and very large quantities of an expensive electrolytic salt are required to be present in the second solution to accomplish desorption of the diluent from the carbon.

Various patents describe the electrochemical techniques of treating effluents. For example, Tarjanyi, et al., U.S. Pat. No. 3,730,864 entitled: "Descreasing the Phenolic Content of Liquids by an Electrochemical Technique", is directed to a method for decreasing the phenolic content of a solution which comprises passing an electric current through a solution containing the phenolic material and oxidizing it completely to carbon dioxide and water. This solution is contained as the electrolyte in a cell having at least one positive and one negative electrode between which the current is passed. The electrode also contains a bed of particles which are distributed therein such that the porosity of the bed is from about 40 to 80 percent. The electrolysis of the electrolyte is continued until the desired reduction in the phenolic content is obtained.

A second patent is Makrides, et al. U.S. Pat. No. 3,730,855 entitled: "Electrochemical Control of Adsorption and Desorption With Activated Carbon", is directed to a method and apparatus for controlling the adsorption-desorption behavior of activated carbon. Adsorption and desorption are controlled by controlling the potential at the interface between the carbon and the solution containing the species to be adsorbed or the solution into which the adsorbed species are to be desorbed. Makrides indicates a technique whereby organic materials are adsorbed onto a bed of carbon when an electrical potential is maintained across the interface of the carbon and the solution. After adsorbing for a period of time the carbon will become saturated with the organic material and will be unable to adsorb as efficiently. When this happens, the carbon is contacted with a second solution, a conducting solution, and the potential value is changed to either a negative potential or a higher positive potential. By maintaining the solution at this new potential value, the previously adsorbed organic material will desorb into the second solution. After the carbon is sufficiently desorbed (regenerated), it is again exposed to another effluent stream and will again adsorb the organic material. This adsorbing-desorbing procedure is continuously repeated provided a potential difference is maintained. Although Makrides discloses that a wide variety of organic materials can be used, such as: organic acids and their salts, amines, phenols, proteins, sugars, milk solids, urea, and anions such as $PO_4^{-3}$ and $NO_3^{-1}$, only sodium chloride and acetic acid, sodium chloride and amyl alcohol, and $Na_2SO_4$ are exemplified. There is no appreciation that hydroxyaromatic compounds containing at least one OH group joined directly to the aromatic ring cannot be desorbed at positive potential.

Now a new process for renewing the adsorptive capacity of a bed of carbon by electromechanical adsorbate transformation has been invented. This process is especially useful for hydroxyaromatic compounds and is particularly useful in the standard tertiary water treatment processes. The main advantage of the process over other electro-oxidative methods for water purification is its low power requirement. This electric power saving is mainly due to avoidance of complete oxidation of the hydroxyaromatic adsorbate; e.g., adsorbed phenol evidently requires only two electrons per molecule to change it to a species which has either a strong affinity for the carbon or a low affinity for the conducting solution, while twenty-eight electrons per molecule would be required for complete oxidation to carbon dioxide and water. Power costs are also lowered by low total voltage and the effect of low current on resistive losses, leading to a total decrease in power of some twenty-fold compared to conventional electro-oxidative water treatment processes.

An object of this invention is to provide a process for renewing the adsorptive capacity of a bed of carbon to adsorb hydroxyaromatic compounds. A more particular object of this invention is to provide a process for renewing the adsorptive capacity of a bed of carbon so that a substantial savings in carbon replacement costs, capital investment, and operational costs can be realized when this process is incorporated into a standard tertiary water treatment process.

A further object of the present invention is to provide a process that will lead to approximately a twenty-fold decrease in power costs compared to the conventional electromechanical oxidation of organic compounds.

Still further, an object of the present invention is to provide a process which will decrease the required volume of conducting (renewal) solution as much as 10,000 fold, as compared to a process which renews carbon capacity by desorption.

Other objects of this invention will become apparent to one skilled in the art based upon the ensuing description.

SUMMARY OF THE INVENTION

Briefly this invention relates to a process for renewing the adsorptive capacity of a bed of active carbon by electrochemical adsorbate transformation. Adsorbate transformation is an electrochemical oxidation involving only a few electrons per molecule. In this process, a bed of carbon is contacted with an effluent containing at least one hydroxyaromatic compound until an appreciable amount of the compound is adsorbed onto the bed of carbon. A conductive solution is then introduced to the bed of carbon and the carbon is made the positive electrode of an electrolytic cell. A positive potential is applied to the previously uncharged bed of carbon and the hydroxyaromatic compounds, such as phenols, substituted phenols, naphthol, etc. which were adsorbed onto the carbon are transformed. The compounds are transformed by the positive potential, which is less than that required for complete oxidation, into a species which has either a high affinity for the carbon or a low affinity for the conducting solution. The applied potential is then removed so that the bed of carbon is back to the no-applied-potential condition and additional effluent containing at least one hydroxyaromatic compound is introduced to the bed. The carbon will again adsorb the hydroxyaromatic compound with this procedure being continuously repeated until the bed of carbn has substantially no ability to remove additional compounds from the effluent.

This process is an improvement over current conventional electrochemical processes because of its low power requirements. Only one twentieth of the current needed to oxidize the hydroxyaromatic compound to carbon dioxide and water is utilized. The process also does not necessitate disposing of a second very large volume of solution which eventually becomes concentrated with a large quantity of organic material. This solution has to be disposed of when it can no longer absorb hydroxyaromatic compounds from the carbon. Disposing of such an untreated solution, which can be as high as 20% of the volume of the treated effluent, poses environmental problems, particularly when the hydroxyaromatic concentration is over 10 ppm.

DETAILED DESCRIPTION OF THE INVENTION

By the process of this invention one is able to renew the adsorptive capacity of a bed of active carbon for adsorption of hydroxyaromatic compounds contained in an effluent. Hydroxyaromatic compounds containing at least one OH group joined directly to the aromatic ring, include phenol, substituted phenol, alkyl phenol, aryl phenol, alkaryl phenol, halo phenol, dihydroxy benzene, hydroxy naphthalene, chlorophenols, cyclohexylphenol, xylenenols, cresols, trichlorophenols, catechol, resorcinol, hydroquinone, pyrogallol, naphthols and the like.

Alcohols, such as benzyl and amyl alcohol are not operative in the process taught in this application because the alcohol will desorb back into the electrolytic solution when a positive or negative voltage is applied. This desorption effect at both positive and negative potentials is the normal behavior expected for all organic materials using a desorption technique as delineated by the art. The unexpected electrochemical adsorbate transformation occurs only for hydroxyaromatic compounds wherein the adsorbates are transformed to a non-desorbable species at positive potential. This non-desorbable feature permits the carbon to remove additional hydroxyaromatic compounds from an effluent without the necessity of employing a second concentrated solution into which to desorb the compound.

In such a process a bed of active carbon is contacted with an effluent containing at least one hydroxyaromaticcompound at no applied voltage. The bed of carbon can be constructed of various types of carbon, including activated carbon derived from any carbonaceous source including without limitation, coal, wood, petroleum, coke, etc. The carbon can be either in the granular or powder form provided a large surface area is exposed. A surface area larger than one hundred square meters per gram is acceptable, an area above five hundred square meters per gram is preferred and an area above one thousand square meters per gram is most preferable. Commonly, the carbon is formed into a bed of particles and is contained in a metal, plastic, glass, etc. container. When a relatively inert material container is employed, the container will serve as the external conductor and the carbon will serve as the positive electrode in an electrolytic cell during applied potential. In other cases, a suitable, relatively inert conducting metal or graphite rod can be inserted into the carbon bed. The other electrode (the negative electrode) is generally constructed of metal or graphite and for economic reasons should have a reasonably low hydrogen overvoltage so that the primary negative electrode reaction occurring is:

$$2H^+ + 2e^- \rightarrow H_2$$

For small beds, one negative electrode (cathode) is sufficient but two or more cathodes will be required for larger beds so that the appropriate current density can be maintained. The source of voltage can be any low voltage D.C. source which can deliver sufficient power to match the size of the carbon bed employed.

The bed of carbon which is contacted with the effluent containing the hydroxyaromatic compound will adsorb an appreciable amount of the compound onto its surface. By appreciable amount is meant at least 30 percent of the concentration of the existing hydroxyaromatic compound. The adsorption is conducted at no applied potential. For best results, the effluent solutions contain the hydroxyaromatic compound in dilute aqueous form, preferably below ten thousand ppm, more preferably below one thousand ppm, and most preferably below one hundred ppm in hydroxyaromatic material. After an appreciable amount of the hydroxyaromatic compound is adsorbed onto the bed of carbon, a conducting solution is introduced to the bed of carbon and a positive potential is applied. The conductive solution can either be a separate solution which replaces the effluent solution or it can be made by adding an electrolytic salt to the present effluent.

Positive voltage is applied to the bed of carbon only for a brief period of time, for example ½—2 hours, to change the carbon's potential from open circuit value and to maintain a positive potential with respect to a reference electrode such as the Standard Calomel Electrode, referred hereinafter as S.C.E. The required potential difference between the bed of carbon and a reference electrode during adsorbate transformation should be a value less than that required for complete oxidation of the hydroxyaromatic compound. This is generally below 1.2 volts S.C.E. Preferably, a value between about 0.80 and about 1.2 volts S.C.E. is used and, more preferably, a value between about 0.9 and about 1.1 volts S.C.E. should be used. The most preferable value is 1.0 volts S.C.E. Higher voltages are wasteful of power and can cause undesirable cathode and/or anode reactions and too low voltages, less than about 0.80 volts S.C.E. can reduce the efficiency of the process as can be understood by one skilled in the art. The open-circuit value of a carbon electrode in contact with a conducting solution is about zero to about 0.2 volts S.C.E.

If the bed of carbon is made negative instead of positive, with respect to its open-circuit voltage, desorption of most of the hydroxyaromatic compound would occur. This behavior is completely contrary to the inventive process wherein no desorption is observed. This suggests that the mechanism for renewal of adsorptivity at positive potential is due to an electrochemical transformation (partial oxidation) of the adsorbed hydroxyaromatic compound. The specific electrode reaction occurring at only the positive potential during adsorbate transformation is uncertain. However, since (a) the inventive process consumes only about two electrons per adsorbed molecule, (b) very little current passes at the positive potential in the absence of adsorbed species and positive-potential treatment does not greatly increase adsorptive capacity of fresh carbon, and (c) no organics are detected in the conductive solution which verifies the fact that no desorption occurs, a highly probable explanation is that the adsorbed hydroxyaromatic compounds are transformed into a species having either a high affinity of the carbon or a low affinity for the conducting solution. The well known anodic reaction for conversion of hydroquinone to quinone is suggestive:

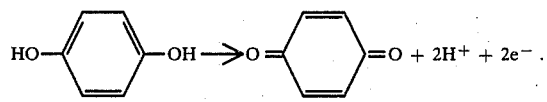

Preferred current densities are between about one microamp and about five hundred microamps per square meter of carbon surface and, more preferably, between about five microamps and about two hundred microamps per square meter of carbon surface. Most preferably, a current density between about ten microamps and about one hundred microamps per square meter of carbon surface is employed.

The process is preferably operated at atmospheric pressure and ambient temperature primarily for economic reasons, but higher or slightly lower pressures are feasible. Higher and lower temperatures than ambient can be used as well. A lower temperature than ambient can slow down the adsorption rate and too high a temperature can reduce adsorptivity and/or deteriorate the carbon bed.

The process requires only a brief period of time at a positive potential, after which the adsorptive capacity of the bed of carbon has been renewed and the applied potential is disconnected, and contact with reintroduced effluent is resumed. The process can be repeated until the freshly-renewed adsorptive capacity of the bed of carbon for the hydroxyaromatic compound is substantially reduced. By substantially reduced, it is meant that the adsorptive capacity of the bed of carbon for the hydroxyaromatic compound has fallen to no more than 25% of the bed's original adsorptive capacity. And at any time, a totally spent bed of carbon can be regenerated by partial burning. However, it should be emphasized that the bed of carbon will not have to undergo a complete regeneration nearly as often as a bed of carbon subjected to the conventional technique. Furthermore, the same conducting solution can be used for many adsorbate transformations because no organics are released into it.

In a second embodiment, two carbon beds are placed in series, the object being to handle effluent streams containing a wide spectrum of organic compounds, only one or a few of which are hydroxyaromatics. In conventional operation, the hydroxyaromatics would be the first compounds to "break through" and necessitate carbon regeneration. In this embodiment, however, the first bed would be regenerated conventionally and the second or "guard" bed, which would contain mostly hydroxyaromatics, which had broken through the first bed, would be renewed more frequently by the presently taught electrochemical adsorbate transformation process. The result would be to lower the required number of conventional regenerations.

The process of the present invention will be further illustrated by way of the following non-limitative experiments.

GENERAL EXPERIMENTAL PROCEDURE

Measurements were made with three electrode electrolysis cells, with cell volumes between 60 and 700 milliliters. The carbon electrode was a 50 milligram sample of compressed Norite A (1200 m$^2$/g) or Aqua Nuchar A (1000 m$^2$/g). The counter electrode was a wire constructed of platinum sealed into the glass electrolysis cell as was the salt bridge connected to a Standard Calomel Electrode (S.C.E.) used as a reference electrode.

The electrolyte, 2% sodium sulfate in conductivity water deaerated with helium, was circulated through the cell by pumping it through the pressed carbon electrode and back out to the cell. Acidity of the electrolyte was kept in the pH range four to six by addition of one percent sulfuric acid.

Phenol concentrations were measured to 0.1 ppm using the 271 nanometers and 209 nanometers ultraviolet spectrum peaks. Total organic analysis (TOC) was made when appropriate.

Although the invention will be described in detail for the purposes of illustration, it is to be understood that such detail is solely for that purpose and that variations can be made therein by those skilled in the art without departing from the spirit and scope of the invention, except as it may be limited by the claims.

EXPERIMENT 1

This experiment illustrates the process of this invention whereby the adsorptive capacity of a bed of active carbon was renewed. In this experiment, sixty grams of the electrolytic solution (see discussion above) containing a concentration of 80 parts per million (ppm) of phenol was added to the electrolysis cell. The solution was circulated through the bed of carbon overnight at "no applied potential" (NAP), and this action caused the concentration of phenol in the solution to fall to 4.7 ppm. A voltage was then applied to the bed of carbon and maintained at +1.0 volt S.C.E. for one-half hour, in which the current varied from 20 to 50 microamps per square meter of carbon surface, and then the bed of carbon was returned to NAP by disconnecting the applied potential. The concentration of phenol in the solution was observed to be less than 1.0 ppm. Additional phenol was then added to the electrolytic solution to bring the concentration up to 40 ppm. Again, the solution was circulated through the bed of carbon, this time for two days, and this action caused the concentration of phenol in the solution to drop to 6.4 ppm. The circulatory action was at NAP. The bed of carbon was then maintained at +1.0 volts S.C.E. for one-half hour, in which the current varied from 20 to 50 microamps per square meter of carbon surface, and then returned to NAP by disconnecting the applied potential. The concentration of phenol in the solution was observed to be less than 1 ppm. For a third time additional phenol was added to the electrolytic solution to increase the concentration, this time to a concentration of 20 ppm. The solution was again circulated through the bed of carbon overnight and this action caused the concentration of phenol in the solution to drop to 6.8 ppm. The circulatory action was again at NAP. The bed of carbon was then maintained at +1.0 volts S.C.E. for one-half hour, in which the current varied from 20 to 50 microamps per square meter of carbon surface, and then returned to NAP by disconnecting the applied potential. The concentration of phenol in the solution was observed to be less than 1 ppm.

The total quantity of phenol added to the electrolytic solution amounted to 0.18 grams of phenol per gram of carbon and yet the adsorptive capacity of the bed of carbon was renewed so completely that it equilibrated with a solution containing less than 1 ppm of phenol. The added 0.18 grams of phenol represents a 15% phenol loading (0.18/1.18) which is fifteen times the loading normally achieved with an electrolytic solution having a concentration of 1 ppm of phenol.

The absence of phenol or any other organic compound in the electrolytic solution was confirmed by making a total organic carbon (TOC) analysis. The total electrical charge passed at +1.0 volts S.C.E. was equivalent to approximately two electrons per molecule of phenol added to the electrolysis cell.

EXPERIMENT 2

A comparative experiment was performed to exemplify the differences between the inventive process and a desorption carbon regeneration process. In this experiment, sixty grams of the electrolytic solution containing a concentration of 60 ppm of phenol was added to the electrolysis cell. The solution was circulated through the bed of carbon overnight at "no applied potential" (NAP) and this action caused the concentration of phenol in the solution to fall to 5.4 ppm. A voltage of −1.6 volts S.C.E. was then applied to the bed of carbon for one-half hour and the concentration of phenol in the solution was observed to have risen to 40 ppm.

This shows that hydroxyaromatics behave as organic materials at negative potentials, with the result being equivalent to the Makrides desorption regeneration process.

Based on the result of experiment 2, it can be seen that there are strict limits as to the extent to which the equilibrium between adsorbed material and solution material can be shifted by an applied potential. By using the formula:

$$K = \frac{(\text{gm adsorbed})/(\text{gm carbon})}{(\text{gm solute})/(\text{gm solution})},$$

where K is a "distribution coefficient", we observe that K changes only by a ratio of 20:1 between NAP and −1.6 volts S.C.E. (Larger applied potentials are not possible due to the large hydrogen evolution currents which occur). Thus:

$$K_{NAP} = \frac{(60 \times 54.6 \times 10^{-6})/(50 \times 10^{-3})}{(60 \times 5.4 \times 10^{-6})/(60)} = 12,000$$

$$K_{-1.6 \text{ volts}} = \frac{(60 \times 20 \times 10^{-6})/(50 \times 10^{-3})}{(60 \times 40 \times 10^{-6})/(60)} = 600$$

From these K values it is possible to calculate the volume of electrolytic solution required to regenerate a given volume of carbon by desorption, i.e., regenerated to the extent that the carbon would give only 1 ppm of phenol when contacted with water. This regenerating electrolytic solution volume would amount to roughly 1200 times the bed volume if regeneration by desorption is conducted when the phenol concentration on the carbon reaches 5 ppm, because this requires the regenerating electrolytic solution to have a phenol concentration of only 20 ppm. This amount of phenol laden solution would be generated for each carbon renewal cycle by desorption and, in turn, would create a tremendous disposal problem. In addition, salt would have to be added to this solution to make it conductive and this would complicate the disposal problem as well as being expensive. Assuming a 1% salt content in the electrolytic solution, about five hundred pounds of salt would be needed per pound of phenol removed.

EXPERIMENT 3

A comparative experiment was performed to illustrate that the inventive process is non-applicable to nonhydroxyaromatic adsorbates, such as alcohols. In this experiment, 700 grams of the electrolytic solution containing a concentration of 6 ppm of benzyl alcohol was added to the electrolysis cell. The solution was circulated through the bed of carbon overnight at "no applied potential" (NAP) and this action caused the concentration of the benzyl alcohol in the solution to drop to 3.9 ppm. A voltage was then applied to the bed of carbon and maintained at +1.0 volt S.C.E. for one-half hour. It was observed that 50% of the benzyl alcohol previously present on the carbon had desorbed into the solution. A similar procedure using an applied voltage of −1.1 volts S.C.E. for one-half hour showed that 55% of the benzyl alcohol desorbed into the solution.

This desorption effect at both positive and negative potentials is the normal behavior expected for all organic materials using a desorption technique as delineated by the prior art. The present inventive process shows unexpected behavior, previously undisclosed, for hydroxyaromatics in which the adsorbates are transformed to a non-desorbable species at positive potential.

I claim:

1. A process for renewing the adsorptive capacity of a bed of active carbon by electrochemical adsorbate transformation, said active carbon having a surface area greater than one hundred square meters per gram, which process comprises the following steps:
    (a) contacting said bed of active carbon with an effluent containing less than one thousand parts per million of at least one hydroxyaromatic compound until an appreciable amount of said hydroxyaromatic compound is adsorbed onto said bed of carbon, said hydroxyaromatic compound being selected from the group consisting of phenol, substituted phenol, alkyl phenol, aryl phenol, alkaryl phenol, halo phenol, dihydroxy benzene, hydroxy naphthalene, chlorophenols, cyclohexylphenol, xylenenols, cresols, trichlorophenols, catechol, resorcinol, hydroquinone, pyrogallol, and naphthols;
    (b) introducing a conductive solution to said bed of carbon and making said carbon the positive electrode of an electrolytic cell;
    (c) applying a positive potential to said bed of carbon of from about 0.8 volts to about 1.2 volts versus a Saturated Calomel Electrode which is sufficient enough to transform said compound into a species which has a high affinity for said carbon or a low affinity for said conducting solution, with said potential being less than that required for complete oxidation of said compound;
    (d) discontinuing the application of said positive potential to said bed of carbon;
    (e) reintroducing effluent containing at least one said hydroxyaromatic compound to said bed of carbon; and
    (f) repeating the above steps until renewed adsorptive capacity of said bed of carbon for said hydroxyaromatic compound is substantially reduced, said adsorptive capacity of the bed of carbon being renewed without desorption of said hydroxyaromatic compound during each application of said positive potential.

2. The process of claim 1 wherein said active carbon has a surface area greater than one thousand square meters per gram.

3. The process of claim 1 wherein said applied positive potential is between 0.9–1.1 volts versus a Saturated Calomel Electrode.

4. The process of claim 1 wherein said hydroxyaromatic compound containing at least one OH group joined directly to the aromatic ring is phenol.

5. The process of claim 1 wherein said hydroxyaromatic compound containing at least one OH group joined directly to the aromatic ring is a substituted phenol.

* * * * *